US012655752B1

(12) United States Patent
Panayirci et al.

(10) Patent No.: US 12,655,752 B1
(45) Date of Patent: Jun. 16, 2026

(54) TEMPERATURE MEASUREMENT AT ONE OR MORE CUTTING ELEMENTS OF A DRILL BIT

(71) Applicant: Schlumberger Technology Corporation, Sugar Land, TX (US)

(72) Inventors: Huseyin Murat Panayirci, Cambridge (GB); Andrew David Robinson, Cambridge (GB); Timothy McAlinden, Suffolk (GB); John George Allen Charlesworth, Cambridge (GB); Ashley Bernard Johnson, Cambridge (GB); Jonathan Robert Hird, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/227,538

(22) Filed: Jun. 4, 2025

(51) Int. Cl.
| | |
|---|---|
| *E21B 47/07* | (2012.01) |
| *E21B 7/04* | (2006.01) |
| *E21B 47/013* | (2012.01) |
| *E21B 49/00* | (2006.01) |
| *G01K 13/08* | (2006.01) |

(52) U.S. Cl.
CPC .............. *E21B 47/07* (2020.05); *E21B 7/04* (2013.01); *E21B 47/013* (2020.05); *E21B 49/003* (2013.01); *G01K 13/08* (2013.01)

(58) Field of Classification Search
CPC .............................. E21B 47/07; E21B 47/013
See application file for complete search history.

(56) References Cited

U.S. PATENT DOCUMENTS

| | | | |
|---|---|---|---|
| 7,604,072 B2 | 10/2009 | Pastusek | |
| 12,410,703 B1 * | 9/2025 | Panayirci | E21B 47/07 |
| 2013/0068525 A1 * | 3/2013 | DiGiovanni | E21B 12/00 |
| | | | 29/592.1 |
| 2014/0231142 A1 * | 8/2014 | Poitzsch | E21B 10/00 |
| | | | 175/50 |
| 2015/0240617 A1 * | 8/2015 | Pelletier | E21B 3/00 |
| | | | 175/41 |
| 2015/0322720 A1 * | 11/2015 | Pelletier | E21B 49/005 |
| | | | 175/41 |

(Continued)

FOREIGN PATENT DOCUMENTS

| | | |
|---|---|---|
| CA | 3012597 C | 3/2021 |
| EP | 1632644 B1 | 5/2011 |
| WO | 2023102528 A1 | 6/2023 |

*Primary Examiner* — David Carroll
(74) *Attorney, Agent, or Firm* — Jeffrey D. Frantz

(57) ABSTRACT

Methods and systems are disclosed that use a temperature sensor integral to a drill bit while drilling. The temperature sensor is configured to measure temperature associated with a cutting element of the drill bit over time while drilling. The temperature sensor is used to generate time-series temperature data representing temperature of the cutting element of the drill bit over time while drilling. The time-series temperature data is processed to determine at least one condition of the wellbore and/or the drill bit while drilling, wherein the at least one condition relates to at least one of: i) detecting that a steering tool of the BHA of the drill bit is active and operating to control the direction of drilling, ii) detecting backwards whirling while drilling, and iii) detecting a transition between different types of reservoir rock while drilling.

18 Claims, 15 Drawing Sheets

Gauge Cutting Element Instrumented with Temperature Sensor

Cone Cutting Element Instrumented with Temperature Sensor

(56)                    References Cited

U.S. PATENT DOCUMENTS

2015/0322772 A1* 11/2015 Pelletier .................. E21B 47/01
                                                        250/254
2015/0322781 A1* 11/2015 Pelletier ................ E21B 49/005
                                                        175/41
2024/0401466 A1* 12/2024 Hird ...................... E21B 47/013

* cited by examiner

310

Gauge Cutting
Element
Instrumented
with Temperature
Sensor

Cone Cutting Element Instrumented
with Temperature Sensor

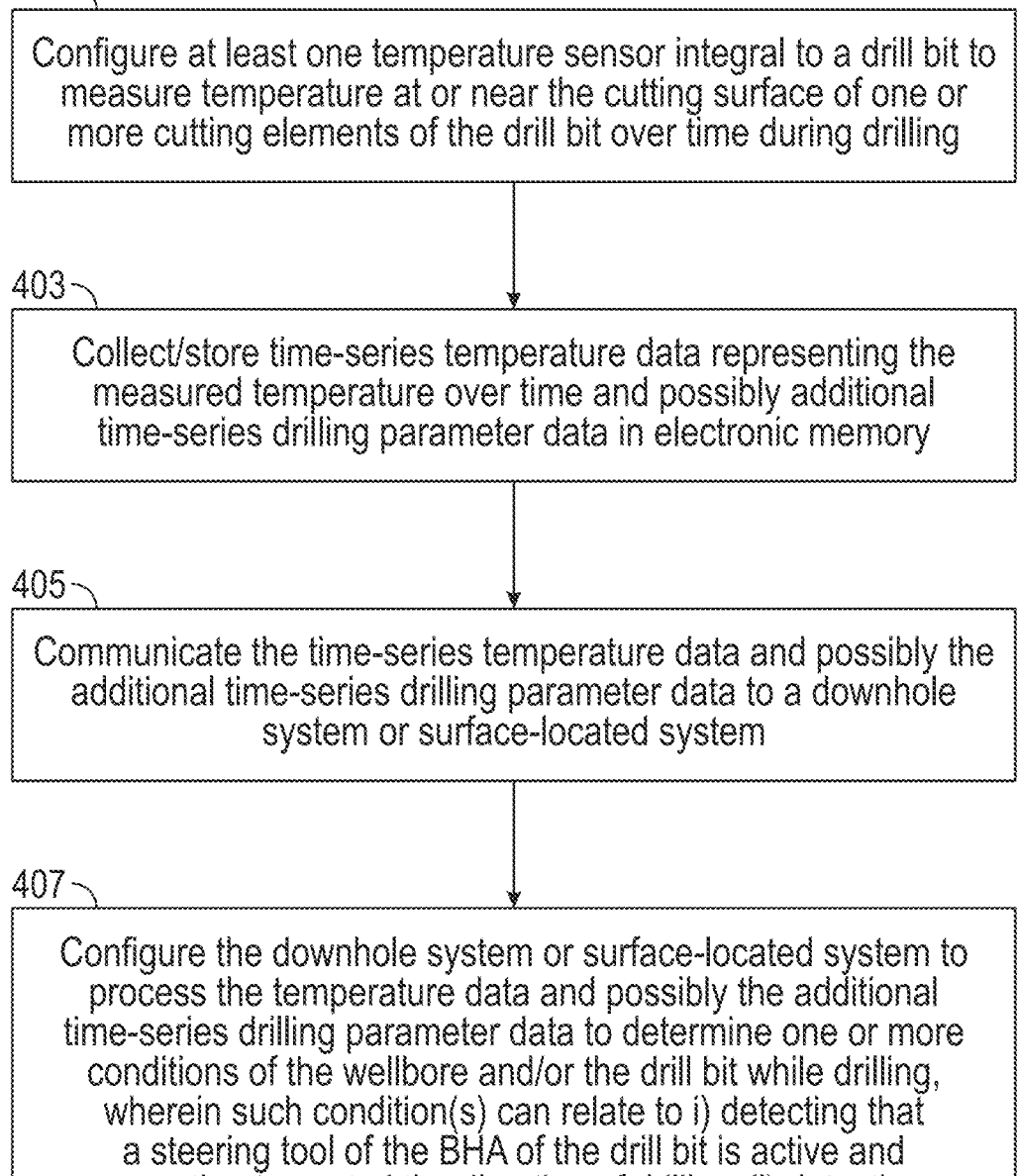

401 ⌐

Configure at least one temperature sensor integral to a drill bit to measure temperature at or near the cutting surface of one or more cutting elements of the drill bit over time during drilling

403 ⌐

Collect/store time-series temperature data representing the measured temperature over time and possibly additional time-series drilling parameter data in electronic memory

405 ⌐

Communicate the time-series temperature data and possibly the additional time-series drilling parameter data to a downhole system or surface-located system

407 ⌐

Configure the downhole system or surface-located system to process the temperature data and possibly the additional time-series drilling parameter data to determine one or more conditions of the wellbore and/or the drill bit while drilling, wherein such condition(s) can relate to i) detecting that a steering tool of the BHA of the drill bit is active and operating to control the direction of drilling, ii) detecting backwards whirl while drilling, and iii) detecting a transition between different types of reservoir rock while drilling.

FIG. 4

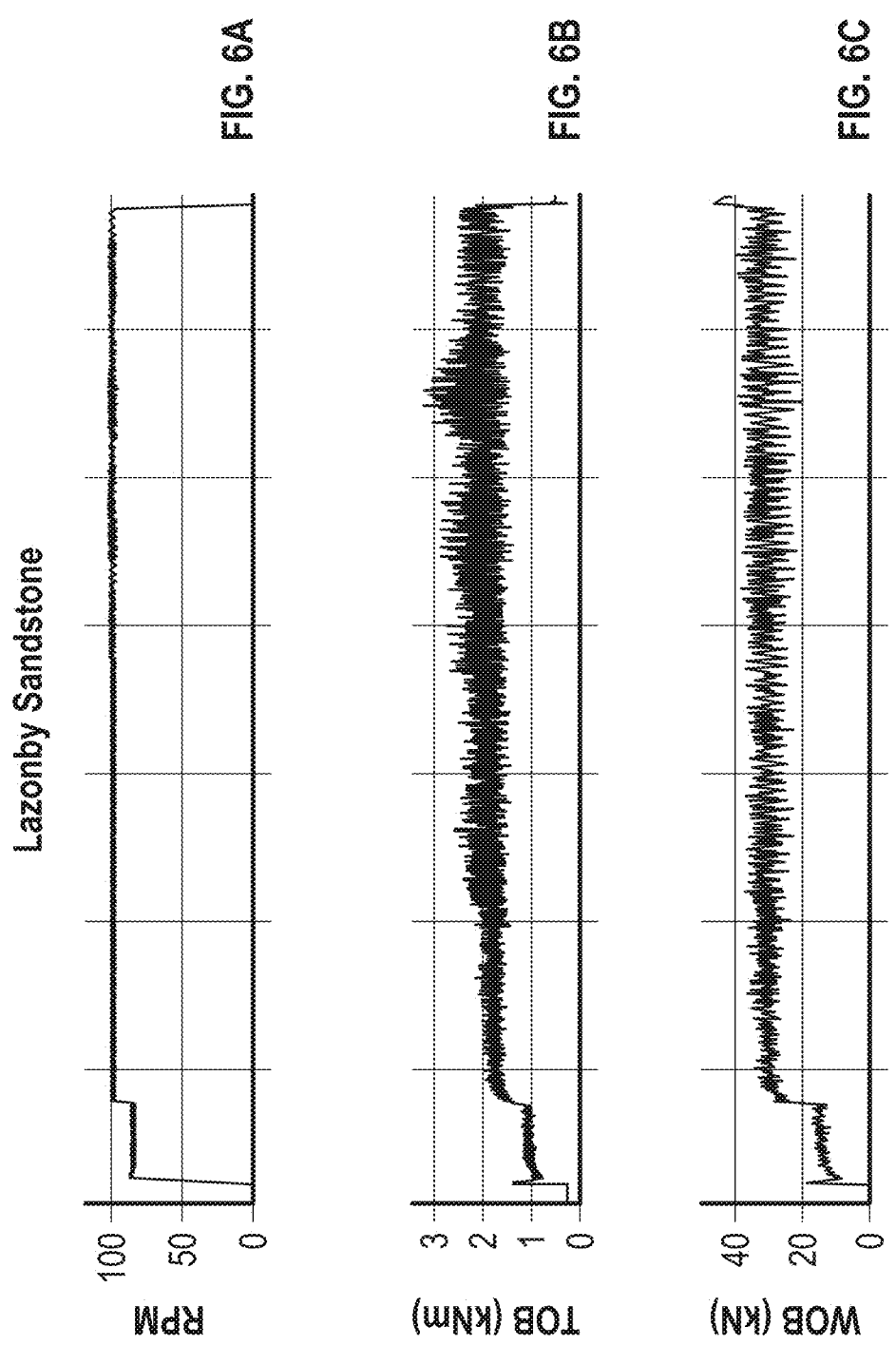

Lazonby
Sandstone

Rocherons
Limestone

Lazonby
Sandstone

2500

1

TEMPERATURE MEASUREMENT AT ONE OR MORE CUTTING ELEMENTS OF A DRILL BIT

FIELD

The present disclosure relates to while drilling systems and methods that detect and monitor conditions of a drill bit and/or a wellbore drilled by a drill bit.

BACKGROUND

Cutting tools, such as downhole drill bits, are used to drill wellbores into the earth to access hydrocarbon reservoirs (e.g., oil and gas reservoirs) and non-hydrocarbon reservoirs (e.g., geothermal reservoirs). The drill bits have relatively long service lives with relatively infrequent failure, but are expensive to design and manufacture.

While drilling a wellbore, the wellbore and/or the drill bit can experience a number of conditions that can impede the drilling operations and possibly necessitate expensive remedial operations. For example, a Bottom Hole Assembly (BHA) of a drill string used to drill a borehole can experience "backwards whirling," which typically begins when some irregularity, like a change in the rock formation or weight on bit, causes a frictional force between the drilling bit and the borehole wall. This force moves the instantaneous center of rotation away from the geometric center of the drill bit and towards the borehole wall. This process can continue and cause the drill bit to "walk" around the borehole. Such backwards whirling can potentially lead to fatigue failure and damage of the drill bit and/or other parts of the BHA. Detecting backwards whirling and reducing backwards whirling can help mitigate failure and damage to the drill bit and/or other parts of the BHA. However, it can be difficult to detect backwards whirling while drilling with accuracy and confidence.

In another example, a steering tool (such as a rotary steerable system) can be integrated as part of the BHA of the drill bit and operated to control the drilling direction of the drill bit while drilling. It can be difficult to detect when the steering tool is active and operating to control the drilling direction of the drill bit while drilling.

In yet another example, the drilling of the borehole can extend through different rock formations and thus transition between different types of reservoir rock. It can be difficult to detect transitions between different types of reservoir rock while drilling.

SUMMARY

Methods and systems are disclosed that use a temperature sensor integral to a drill bit while drilling. The temperature sensor is configured to measure temperature associated with a cutting element of the drill bit over time while drilling. The temperature sensor is used to generate time-series temperature data representing temperature of the cutting element of the drill bit over time while drilling. The time-series temperature data is processed to determine at least one condition of the wellbore and/or the drill bit while drilling, wherein the at least one condition relates to a least one of: i) detecting that a steering tool of the BHA of the drill bit is active and operating to control the direction of drilling, ii) detecting backwards whirling while drilling, and iii) detecting a transition between different types of reservoir rock while drilling.

In embodiments, the temperature sensor can include a thermocouple, a resistance temperature detector (RTD), thermistor, semiconductor-based temperature sensor, infrared temperature sensor, thermometer, bimetallic sensor, change-of-state sensor, silicon diode, or other type of temperature sensor.

In embodiments, the temperature sensor can be configured to measure temperature representative of temperature at or near a cutting surface of the cutting element.

In embodiments, the processing of the temperature data can be performed by a downhole system or a surface-located system.

In embodiments, the at least one condition can relate to detecting that a steering tool of the BHA of the drill bit is active and operating to control the direction of drilling by detecting oscillations in the time-series temperature data for one or more cutting elements and possibly determining frequency of such oscillations and determining whether the frequency of such oscillations corresponds to the time-synchronized rotational frequency of the drill bit (which can be calculated by dividing the time-synchronized RPM of the drill bit by 60). Furthermore, the amplitude of such oscillations can be measured to provide an indication of the magnitude of the steering forces applied by the steering tool as the amplitude of such oscillations increases with the magnitude of steering force, since the engagement of the cutting elements of the drill bit increases accordingly.

The at least one condition can relate to detecting backwards whirling while drilling by detecting a drop in the time-series temperature data for one or more cutting elements of the drill bit together with an increase in the time-synchronized rotational speed (RPM) of the drill bit.

The at least one condition can relate to detecting a transition between different types of reservoir rock while drilling by detecting decreases or increases in the time-series temperature data for one or more cutting elements of the drill bit together with minimal variation in the time-synchronized weight-on-bit (WOB) and rotational speed (RPM) of the drill bit.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 4 is a flowchart of a method for real-time detection and monitoring of condition(s) of a wellbore and/or drill bit while drilling based on temperature measurements made by at least one temperature sensor integral to the drill bit, according to at least one embodiment of the present disclosure;

FIGS. 6A, 6B, 6C, and 6D depict plots of rotational speed (RPM), torque-on bit (TOB), weight-on-bit (WOB), and rate of penetration (ROP) of the drill bit of FIG. 5 over time during a drilling experiment performed on Lazonby sandstone where a steering force is applied to the BHA in a North-South direction and incremented from 0 kN to 10 kN to 20 kN to 30 kN over time as shown in FIG. 6E, which results in deviating the borehole; the application of the steering force induced oscillations in the TOB of FIG. 6B when the steering tool started rubbing on the borehole wall as it deviated from vertical;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the present disclosure relate to real-time detection and monitoring of condition(s) of a wellbore and/or drill bit while drilling based on temperature measurements made by at least one temperature sensor integral to the drill bit. The temperature sensor may be configured to measure temperature at or near the cutting surface of a cutting element while drilling. The temperature measurements may be associated with time and/or depth of the drill bit. This may help a drilling operator dynamically adjust or control the drilling (for example, by adjusting one or more drilling parameters) based on the condition(s) of the wellbore and/or drill bit as determined from the real-time detection and monitoring.

Figure 1:
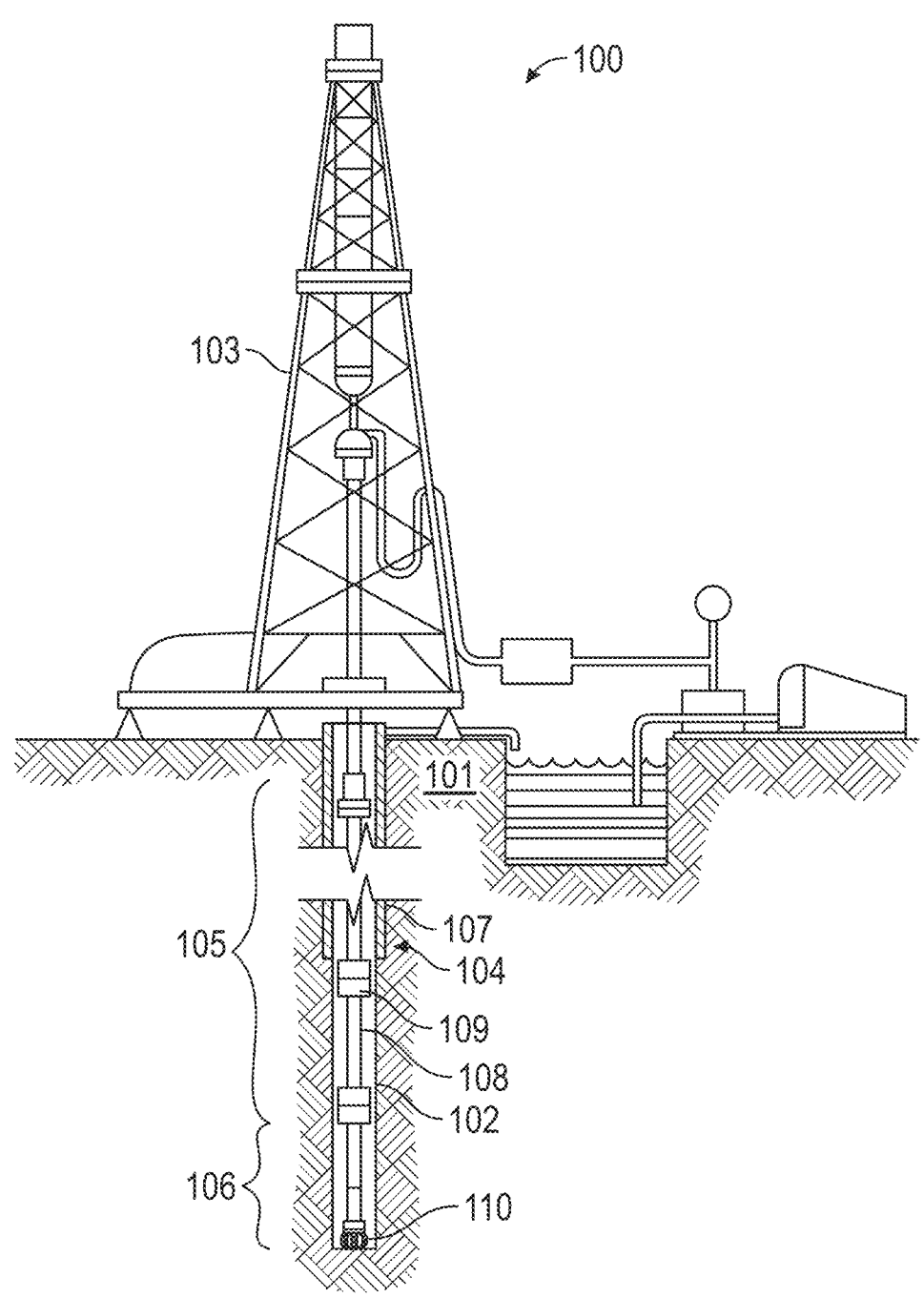
FIG. 1 is a schematic diagram illustrating a drilling system for drilling an earth formation to form a wellbore, according to at least one embodiment of the present disclosure.

FIG. 1 shows a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a drill bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the drill bit 110 for the purposes of cooling the bit 110 and cutting structures thereon, and for lifting cuttings out of the wellbore 102 as it is being drilled.

The BHA 106 may include the drill bit 110 or other components. An example BHA 106 may include additional or other components (e.g., coupled between the drill string 105 and the drill bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include steering tool (such as a rotary steerable system (RSS)) that can be operated to control the direction of drilling of the drill bit 110, and thereby the trajectory of the wellbore. In embodiments, at least a portion of the steering tool may maintain a geostationary position relative to an absolute reference frame, such as gravity, magnetic north, and/or true north. Using measurements obtained with the geostationary position, the steering tool can be operated to locate the drill bit 110, change the course of the bit 110, and direct or steer the BHA 106 and drill bit 110 on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The drill bit 110 in the BHA 106 may be any type of bit suitable for degrading down hole materials. For instance, the drill bit 110 may be a drill bit suitable for drilling the earth formation 101. Example types of drill bits used for drilling earth formations are fixed-cutter or drag drill bits. In other embodiments, the drill bit 110 may be a mill used for removing metal, composite, elastomer, other materials downhole, or combinations thereof. For instance, the drill bit 110 may be used with a whipstock to mill into casing 107 lining the wellbore 102. The drill bit 110 may also be a junk mill used to mill away tools, plugs, cement, other materials within the wellbore 102, or combinations thereof. Swarf or other cuttings formed by use of a mill may be lifted to surface, or may be allowed to fall downhole.

In accordance with at least one embodiment of the present disclosure, time-series temperature data representing temperature measurements made by at least one temperature sensor integral to the drill bit 110 over time while drilling can be obtained and communicated to a downhole system or surface-located system, and the time-series temperature data can be processed to determine condition(s) of the wellbore and/or the drill bit 110 while drilling, wherein such condition(s) can relate to i) detecting that a steering tool of the BHA 106 of the drill bit 110 is active and operating to control the direction of drilling, ii) detecting backwards whirling while drilling, and iii) detecting a transition between different types of reservoir rock while drilling.

In one example, detecting that a steering tool of the BHA 106 of the drill bit 110 is active and operating to control the direction of drilling can involve detecting oscillations in the time-series temperature data for one or more cutting elements of the drill bit 110 and possibly determining frequency of such oscillations and determining whether the frequency of such oscillations corresponds to the time-synchronized rotational frequency of the drill bit 110 (which can be calculated by dividing the time-synchronized RPM of the drill bit 110 by 60). Furthermore, the amplitude of such oscillations can be measured to provide an indication of the magnitude of the steering forces applied by the steering tool as the amplitude of such oscillations increases with the magnitude of steering force, since the engagement of the cutting elements of the drill bit 110 increases accordingly.

In another example, detecting backwards whirling while drilling can involve detecting a drop in the time-series temperature data for one or more cutting elements of the drill bit 110 together with an increase in the time-synchronized rotational speed (RPM) of the drill bit 110.

In yet another example, detecting a transition between different types of reservoir rock while drilling can involve detecting decreases or increases in the time-series temperature data for one or more cutting elements of the drill bit 110 together with minimal variation in the time-synchronized weight-on-bit (WOB) and rotational speed (RPM) of the drill bit 110.

Figure 2A:
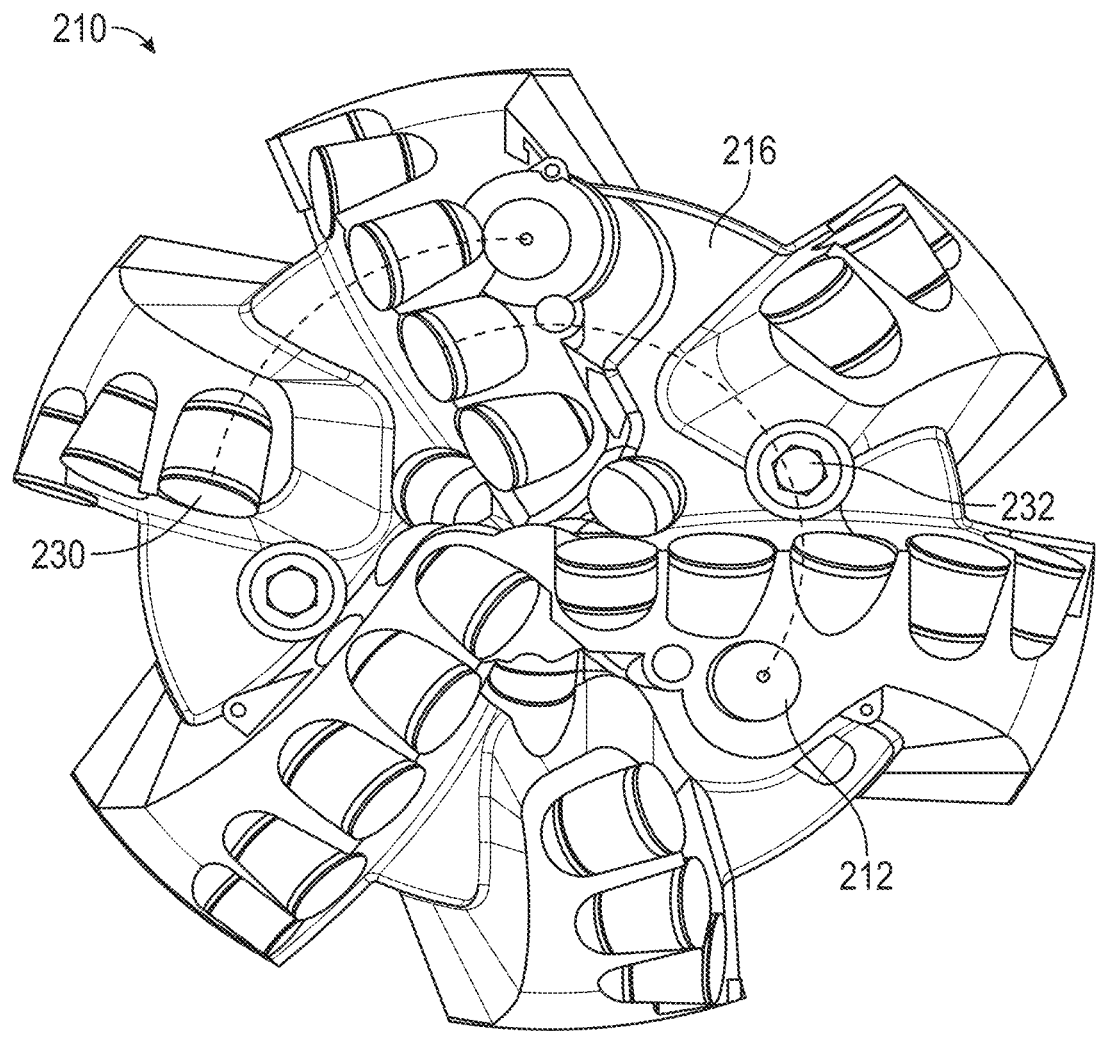
FIG. 2A is a bottom view of a drill bit, according to at least one embodiment of the present disclosure.
Figure 2B:
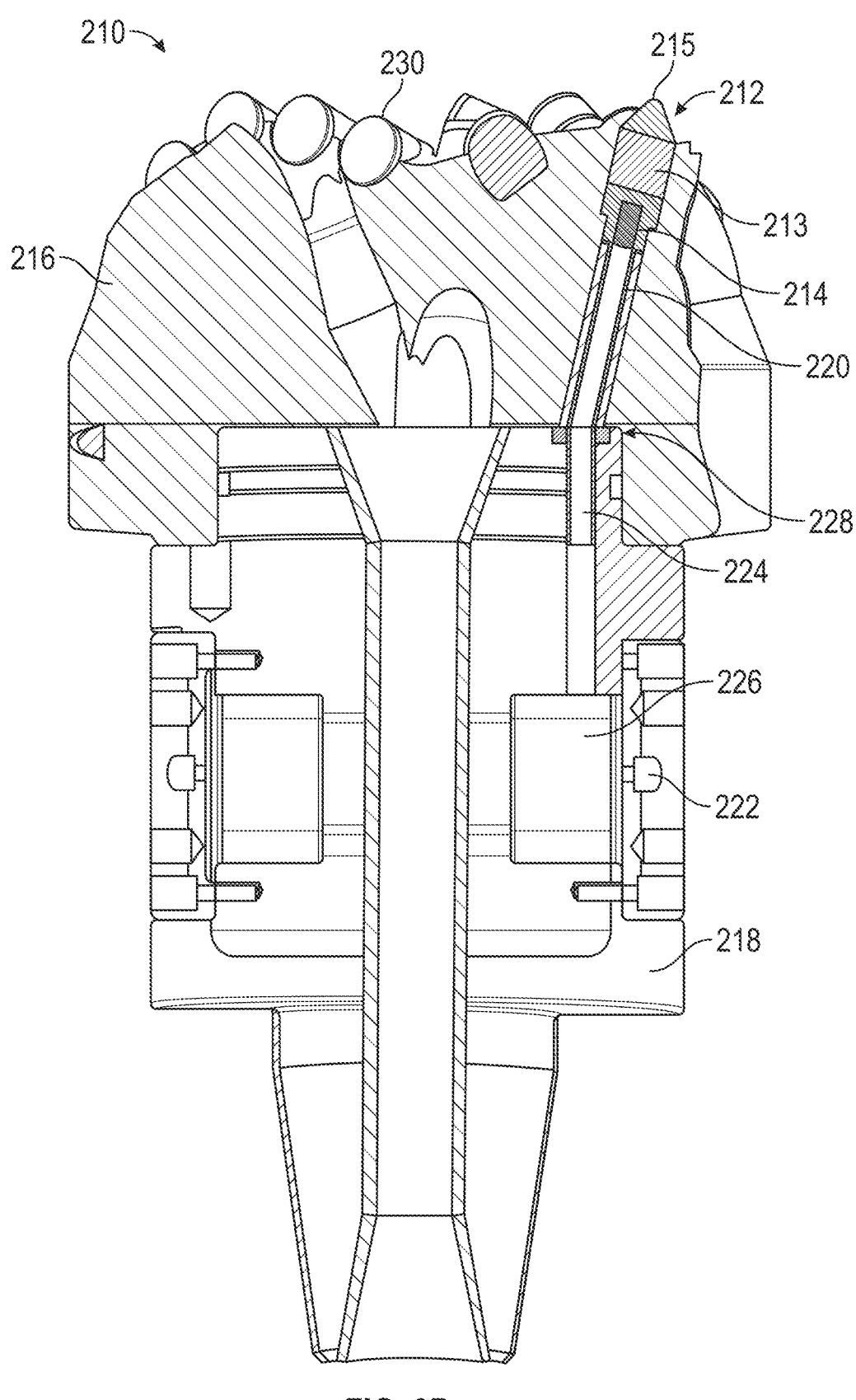
FIG. 2B is a partial cross-sectional view of the drill bit of FIG. 2A.

FIGS. 2A and 2B illustrate an example drill bit 210 according to at least one embodiment of the present disclosure, which can be used for the drill bit 110 of FIG. 1. The drill bit 210 may include conical or other non-planar cutting elements 212 as well as planar or gauge cutting elements 230 (e.g., PDC shear cutters). The drill bit 210 includes a bit head 216 and a pin 218. In the embodiment shown, the bit head 216 may be secured to the pin 218 with a bolted connection, such as with one or more mechanical fasteners 232.

FIG. 2B is a cross-sectional view of the drill bit 210. Cutting element 212 is instrumented with a temperature sensor 214 integral to the cutting element 212. The cutting element 212 may have conical or ridged cutting surface as shown. Alternatively, the cutting element 212 can have a convex cutting surface, a concave cutting surface, a planar cutting surface, any other shaped cutting surface, and combinations thereof. The temperature sensor 214 may be configured to measure a temperature representative of the temperature at or near the cutting surface of the cutting element 212. In the embodiment shown, the temperature sensor 214 is inserted into a body 213 of the cutting element 212. In some embodiments, the body 213 may define a bore that extends into the body 213. The bore may be located in a substrate of the cutting element 212, such as a tungsten carbide substrate or other substrate. In some embodiments, the bore may extend into the insert of the cutting element 212. For example, the bore may extend into a polycrystalline diamond (PCD) insert connected to the substrate. In embodiments, the bore can be formed by creating a small hole in the back of cutting element 212 and drilling through the hole into the superhard table of the cutting element 212 (e.g., into a polycrystalline diamond table). The temperature sensor 214 can then be inserted in this hole with the hole then filled with thermally conductive potting or paste such that the temperature sensor 214 is in good thermal contact with the diamond or other superhard table of the cutting element 212.

The temperature sensor 214 may be any type of temperature sensor. For example, the temperature sensor 214 may include a thermocouple, a resistance temperature detector (RTD), thermistor, semiconductor-based temperature sensor, infrared temperature sensor, thermometer, bimetallic sensors, change-of-state sensors, silicon diodes, any other types of temperature sensor, and combinations thereof.

The temperature sensor 214 may be inserted into the bore. Inserting the temperature sensor 214 into the bore may allow the temperature sensor 214 to measure a temperature representative of the temperature at or near the cutting surface 215 of the cutting element 212. Note that frictional and contact forces of the cutting surface 215 with the rock of the wellbore while drilling may increase the temperature of the cutting surface 215.

In other embodiments, the temperature sensor 214 may be disposed at another location relative to the cutting element 212. For example, the temperature sensor 214 may be in contact with the cutting element 212, or the temperature sensor 214 may be located adjacent to the cutting element 212, or the temperature sensor 214 may be located close to the outer surface of the bit head 216 parallel to the cutting element 212.

The drill bit 210 includes a wiring conduit 220 that extends through at least a portion of the bit head 216 to the pin 218. The wiring conduit 220 may allow wiring from the temperature sensor 214 to extend through the drill bit 210 to an electronics module 222 in the pin 218. In some embodiments, the wiring conduit 220 may include a pipe or a sleeve that is inserted into the bit head 216 during manufacturing. In some embodiments, the bit head 216 may be additively manufactured, and the wiring conduit 220 and/or a void for the wiring conduit 220 may be formed during the additive manufacturing process. In some embodiments, the wiring conduit 220 may extend through an integrally formed portion of the bit head 216. While embodiments of the present disclosure are directed to a bit pin 218, it should be understood that the bit head 216 may be connected to any other connector, including a bit box.

During assembly or manufacture of the bit head 216 and the pin 218, the wiring conduit 220 may align with a pin conduit 224. The wiring from the temperature sensor 214 may pass from the wiring conduit 220 in the bit head 216 to the pin conduit 224. The pin conduit 224 may allow the wiring to pass to the electronics module 222. In this manner, the temperature sensor 214 may be connected to the electronics module 222 in the pin 218. In some embodiments, the wiring conduit 220 may be aligned with the pin conduit 224 when the bit head 216 is secured to the pin 218.

In embodiments, the bit head 216 can be coupled to the pin 218 in any manner. For example, the bit head 216 may be connected to the pin 218 with a bolted connection. In some examples, the bit head 216 may be connected to the pin 218 with a threaded connection. In some examples, when the bit head 216 is coupled to the pin 218, the wiring conduit 220 and the pin conduit 224 may be aligned. In some embodiments, a bolted connection between the bit head 216 and the pin 218 may facilitate the alignment of the wiring conduit 220 and the pin conduit 224.

As discussed herein, the drill bit 210 may include an electronics module 222 with one or more wires or cables connecting the temperature sensor 214 to the electronics module 222. The wire(s) or cable(s) carry the electric signals that represent the temperature measurements performed by the temperature sensor 214. In some embodiments, the electronics module 222 can collect and monitor data representing the temperature measurements made by the temperature sensor 214. In some embodiments, the electronics module 222 may record or store data representing the temperature measurements in electronic memory.

In the embodiment shown, the pin 218 contains one or more instrumentation pockets 226 or other features that can house or connect to electronics module 222. The wiring conduit 220 may extend from the cutting element 212 to the instrumentation pocket 226. In some embodiments, the electronics module 222 may be located in the instrumentation pocket 226. In some embodiments, the instrumentation pocket 226 may include other sensors. For example, the one or more instrumentation pockets 226 may include a force sensor, a torque sensor, an accelerometer, a gyroscopic sensor, a pressure sensor, a temperature sensor to measure temperature of the drilling fluid, any other sensors, and combinations thereof. In some embodiments, the information from the one or more sensors in the instrumentation pocket 226 may be used to detect and monitor condition(s) of the wellbore and/or the drill bit as described herein.

In embodiments, the drill bit 210 can include a fluid and/or pressure seal between the electronic components and the drilling fluid. For example, the bit head 216 may include a head seal 228 between the bit head 216 and the pin 218 at the interface between the wiring conduit 220 and the pin conduit 224. The head seal 228 may include a sealing member, such as an O-ring or other sealing member. The head seal 228 may further include a resilient element. When the bit head 216 is secured to the pin 218, the compressive force of the connection may compress the resilient element against the sealing member. The compressed sealing member may result in a seal between the bit head 216 and the pin 218. This may help to reduce and/or prevent the ingress of drilling fluid and/or other contaminants into the wiring conduit 220 and the pin conduit 224. In some embodiments, the resilient element may be a frustoconical resilient element, such as a Belleville washer. In some embodiments, the resilient element may include a wave spring or other resilient element. In some embodiments, the instrumentation pocket 226 may include a seal between the instrumentation pocket 226 and the borehole annulus to reduce or prevent the ingress of drilling fluid and/or other contaminants into the instrumentation pocket 226.

In the embodiment shown, the bit drill 210 includes multiple cutting elements, including cutting element 212 and cutting element 230. One or more of the cutting elements may be PDC cutters or have other compositions. The drill bit 210 can be equipped with additional temperature sensor(s)

that are similar to temperature sensor 214 as described herein. Such additional temperature sensor(s) can be configured to measure temperature at the cutting surface of other cutting elements, such as cutting element 230. The bit head 216 and the pin 218 can be configured with additional conduits that carry one or more wires or cables connecting the additional temperature sensor(s) to the electronics module 222.

In embodiments, the electronics module 222 can communicate with a downhole device. For example, the electronics module 222 can communicate with a MWD module, such as through a wired and/or a wireless connection. The MWD module can be configured to measure and monitor time-series drilling parameter data while drilling. The time-series drilling parameter data can represent a number of drilling parameters, including torque on the bit (TOB), weight-on-bit (WOB), rotational speed (RPM), and rate penetration (ROP). In other embodiments, one or more other parts of the BHA can be configured to determine such time-series drilling parameter data while drilling. For example, time-series temperature data representing temperature measurements of one or more cutting elements of the drill bit over time can be used to determine such time-series drilling parameter data while drilling as described in U.S. patent application Ser. No. 18/639,374, entitled "Temperature measurement at one or more cutting elements of a drill bit", filed Apr. 18, 2024, herein incorporated by reference in its entirety.

In embodiments, the MWD module or other downhole system (which can include module 222) can be configured to collect the time-series temperature data representing the temperature measurements of one or more cutting elements of the drill bit over time together with time-series drilling parameter data (such as torque on the bit (TOB), weight-on-bit (WOB), rotational speed (RPM), and rate penetration (ROP) over time while drilling) and process this time-series data in real-time while drilling to determine one or more conditions of the wellbore and/or the drill bit 210 while drilling, wherein such condition(s) can relate to i) detecting that a steering tool of the BHA of the drill bit 210 is active and operating to control the direction of drilling, ii) detecting backwards whirling while drilling, and iii) detecting a transition between different types of reservoir rock while drilling. The MWD module or other downhole system can then communicate data representing such condition(s) to a surface-located system for output to a drilling operator. For example, the MWD module may communicate the data representing such condition(s) using any downhole communication system, including mud pulse telemetry, electromagnetic communication, wired drill pipe, drill pipe telemetry, any other downhole communication system, and combinations thereof. The surface-located system can output or otherwise convey the condition(s) of the wellbore and/or drill bit 210 as determined from the monitoring via visual and/or audible alerts presented to the drilling operator. In embodiments, the drilling operator can dynamically adjust or control the drilling (for example, by adjusting one or more drilling parameters) based on the condition(s) of the wellbore and/or the drill bit 210 as represented by the data representing such condition(s).

In other embodiments, the MWD module or other downhole system (which can include module 222) can be configured to collect the time-series temperature data representing the temperature measurements of one or more cutting elements of the drill bit over time together with time-series drilling parameter data over time (such as torque on the bit (TOB), weight-on-bit (WOB), rotational speed (RPM), and rate penetration (ROP) over time while drilling) and communicate such time-series data to a surface-located system. For example, the MWD module may communicate such time-series data using any downhole communication system, including mud pulse telemetry, electromagnetic communication, wired drill pipe, drill pipe telemetry, any other downhole communication system, and combinations thereof. The surface-located system can be configured to process such time-series data to determine one or more condition(s) of the wellbore and/or the drill bit 210 while drilling, wherein such condition(s) can relate to i) detecting that a steering tool of the BHA of the drill bit 210 is active and operating to control the direction of drilling, ii) detecting backwards whirling while drilling, and iii) detecting a transition between different types of reservoir rock while drilling. The surface-located system can output or otherwise convey the condition(s) of the wellbore and/or the drill bit 210 as determined from the monitoring via visual and/or audible alerts presented to the drilling operator. In embodiments, the drilling operator can dynamically adjust or control the drilling (for example, by adjusting one or more drilling parameters) based on the condition(s) of the wellbore and/or the drill bit 210 as determined by the data representing such condition(s).

Figure 3:
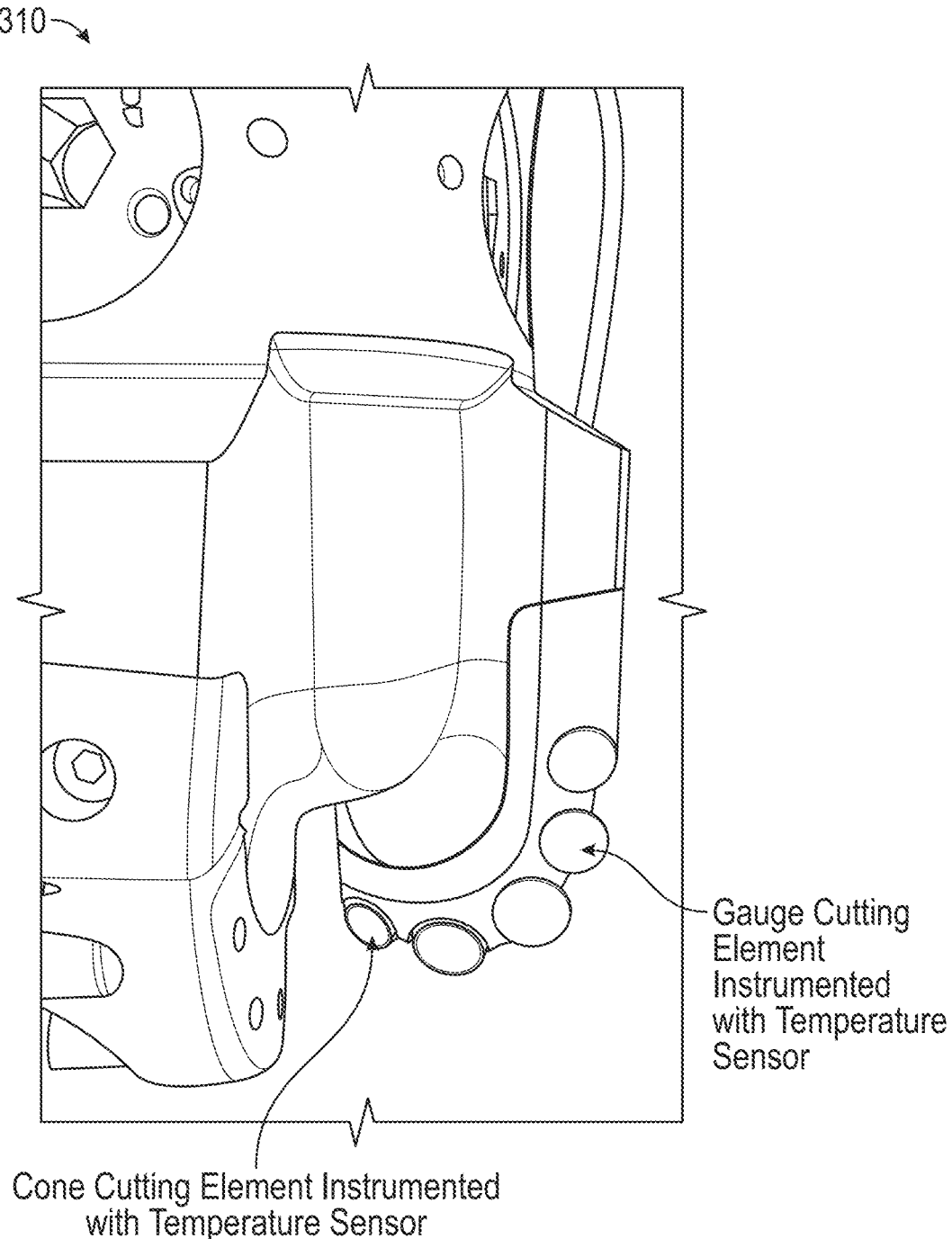
FIG. 3 is an image of part of a drill bit, according to at least one embodiment of the present disclosure.

FIG. 3 is an image of part of a fixed-cutter drill bit 310 which can be used for the drill bit 110 of FIG. 1. The drill bit 310 has a blade with a gauge cutting element instrumented with a temperature sensor as well as a cone cutting element instrumented with a temperature sensor in a manner similar to that described above with respect to FIGS. 2A and 2B.

FIG. 4 is a flowchart that implements a method for real-time detection and monitoring of condition(s) of a wellbore and/or drill bit while drilling based on temperature measurements made by at least one temperature sensor integral to the drill bit.

The operations begin in block 401 by configuring at least one temperature sensor integral to a drill bit (such as the drill bit of FIG. 1, 2 or 3) to measure temperature at or near the cutting surface of one or more cutting elements of the drill bit over time while drilling.

In block 403, time-series temperature data representing the measured temperature over time of 401 and possibly additional time-series drilling parameter data (e.g., RPM data, TOB data, WOB data, ROP data) is collected/stored in electronic memory.

In block 405, the time-series temperature data and possibly the additional time-series drilling parameter data of 403 is communicated to a downhole system or surface-located system.

In block 407, the downhole system or surface-located system is configured to process the time-series temperature data and possibly the additional time-series drilling parameter data to determine one or more conditions of the wellbore and/or the drill bit while drilling, wherein such condition(s) can relate to i) detecting that a steering tool of the BHA of the drill bit is active and operating to control the direction of drilling, ii) detecting backwards whirling while drilling, and iii) detecting a transition between different types of reservoir rock while drilling.

For example, as part of block 407, detecting that a steering tool of the BHA of the drill bit is active and operating to control the direction of drilling can involve detecting oscillations in the time-series temperature data for one or more cutting elements and possibly determining frequency of such oscillations and determining whether the frequency of such oscillations corresponds to the time-synchronized rotational frequency of the drill bit (which can be calculated by dividing the time-synchronized RPM of the drill bit by 60). Furthermore, the amplitude of such oscillations can be measured to provide an indication of the magnitude of the steering forces applied by the steering tool as the amplitude of such oscillations increases with the magnitude of steering force, since the engagement of the cutting elements of the drill bit increases accordingly.

In embodiments, the frequency of oscillations in the time-series temperature data can be extracted by applying a Fast Fourier Transform (FFT) to the time-series temperature data. For the frequency matching the RPM of the bit, the amplitude of that specific frequency should increase as the bit is steering. Alternatively, the frequency of oscillations in the time-series temperature data can be extracted by applying a signal processing technique called "peak finding" to the to the time-series temperature data. By monitoring the increase/decrease in the peak values (i.e. amplitudes of temperature oscillations), one can infer the strength of the steering forces. In order to accurately capture the frequency of oscillations in the time-series temperature data (and thus infer the RPM of the bit), the sampling rate of the time-series temperature data will be at least twice that of the bit RPM, and for accurate amplitude determination then it should be at least ten times that of the bit RPM. In embodiments, the sampling rate of the time-series temperature data can be at several hundred samples per second.

In another example, as part of block 407, detecting backwards whirling while drilling can involve detecting a drop in the time-series temperature data for one or more cutting elements of the drill bit together with an increase in the time-synchronized rotational speed (RPM) of the drill bit.

In embodiments, detecting backwards whirling while drilling can involve monitoring mean values of the time-series temperature data and processing such mean values to flag any decrease larger than a certain threshold (e.g., a percentage such as 20%). Alternatively, detecting backwards whirling while drilling can involve monitoring the derivative (slope) of the time-series temperature data and processing such derivate values to flag any quick decrease in the time-series temperature data. Such processing can be adapted to detect a drop in the time-series temperature data that occurs within a very short amount of time (over a couple of seconds). Any other temperature decrease occurring slower can be for some other reason, e.g. formation change. The increase in RPM of the drill bit can be detected from a gyro signal or from the frequency of oscillations in the time-series temperature data as described above. In this case, the time-series temperature data representing temperature of the gauge cutters over time should oscillate with respect to the RPM of the drill bit while drilling.

In yet another example, as part of block 407, detecting a transition between different types of reservoir rock while drilling can involve detecting decreases or increases in the time-series temperature data for one or more cutting elements of the drill bit together with minimal variation in the time-synchronized weight-on-bit (WOB) and rotational speed (RPM) of the drill bit.

In embodiments, detecting a transition between different types of reservoir rock while drilling can involve monitoring changes (such as changes in mean value) in the time-series temperature data over longer periods (more than a couple of seconds). Temperature changes due to formation changes are expected to occur on all cutters, while temperature changes for backwards whirl will be more emphasized on gauge cutters.

Figure 5:
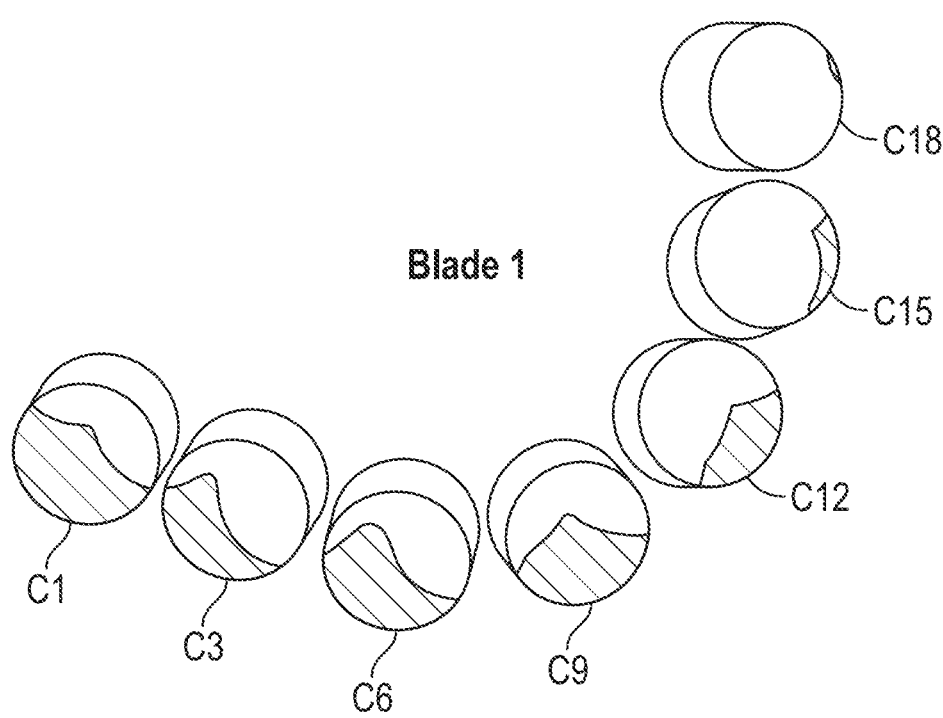
FIG. 5 is a schematic diagram illustrating predicted engagement areas of cutting elements of a drill bit for an ideal case where the drill bit is rotating perfectly around its center. In this ideal case, gauge cutting elements C15 and C18 are expected to have minimum interaction with the wall of the borehole while drilling.

FIG. 5 is a schematic diagram illustrating predicted engagement areas of cutting elements of a drill bit for an ideal case where the drill bit is rotating perfectly around its center. In this ideal case, gauge cutting elements C15 and C18 are expected to have minimum interaction with the wall of the borehole while drilling.

Figures 6D, 6E:
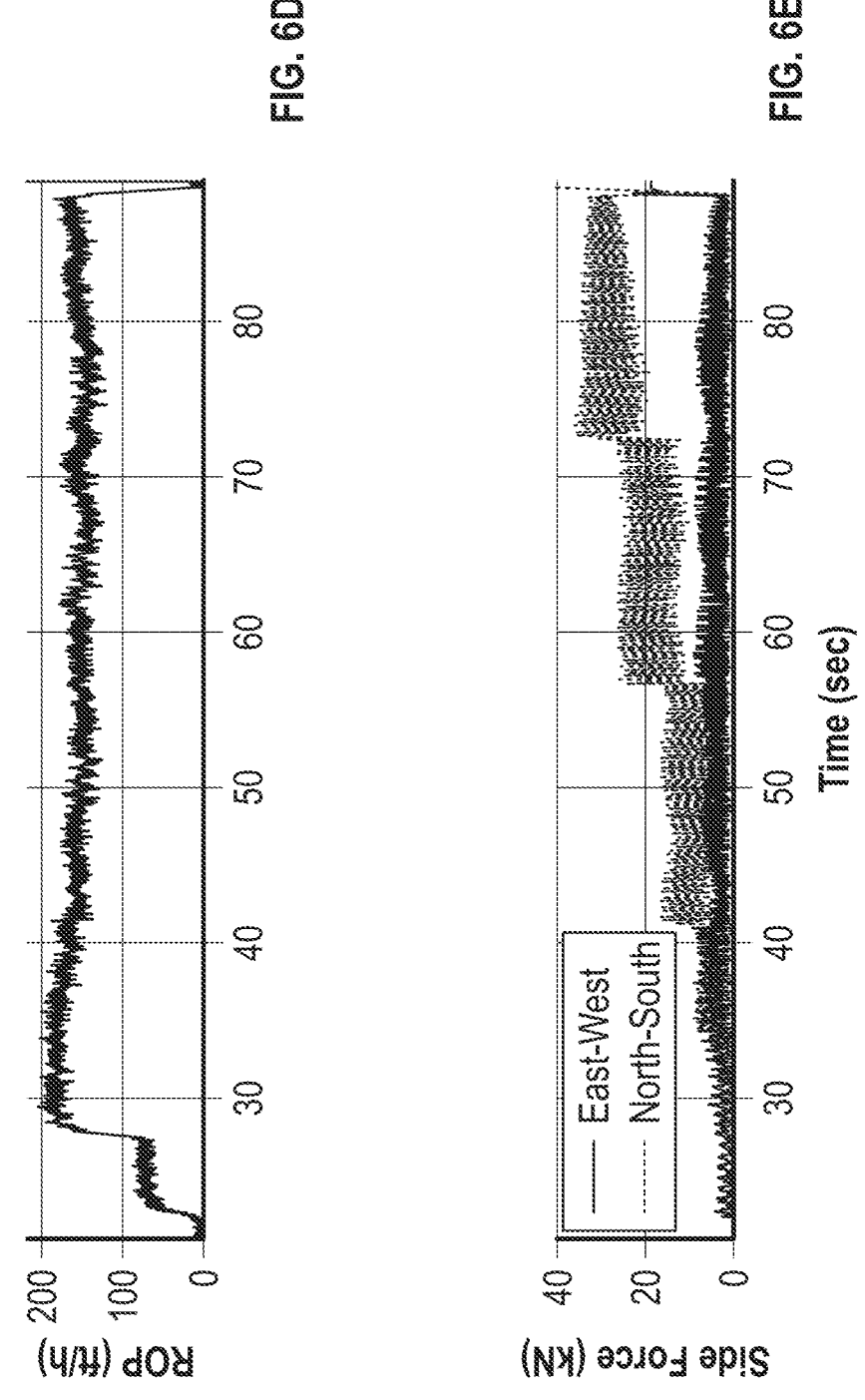

FIGS. 6A, 6B, 6C, and 6D depict plots of rotational speed (RPM), torque-on bit (TOB), weight-on-bit (WOB), and rate of penetration (ROP) of the drill bit of FIG. 5 over time during a drilling experiment performed on Lazonby sandstone where a steering force is applied to the BHA of the drill bit in a North-South direction and incremented from 0 kN to 10 kN to 20 kN to 30 kN over time as shown in FIG. 6E. The drilling experiment of FIGS. 6A-6E results in deviating the borehole, and the application of the steering force during the drilling experiment induced oscillations in the TOB of FIG. 6B when the steering tool started rubbing on the borehole wall as it deviated from vertical.

Figure 7:
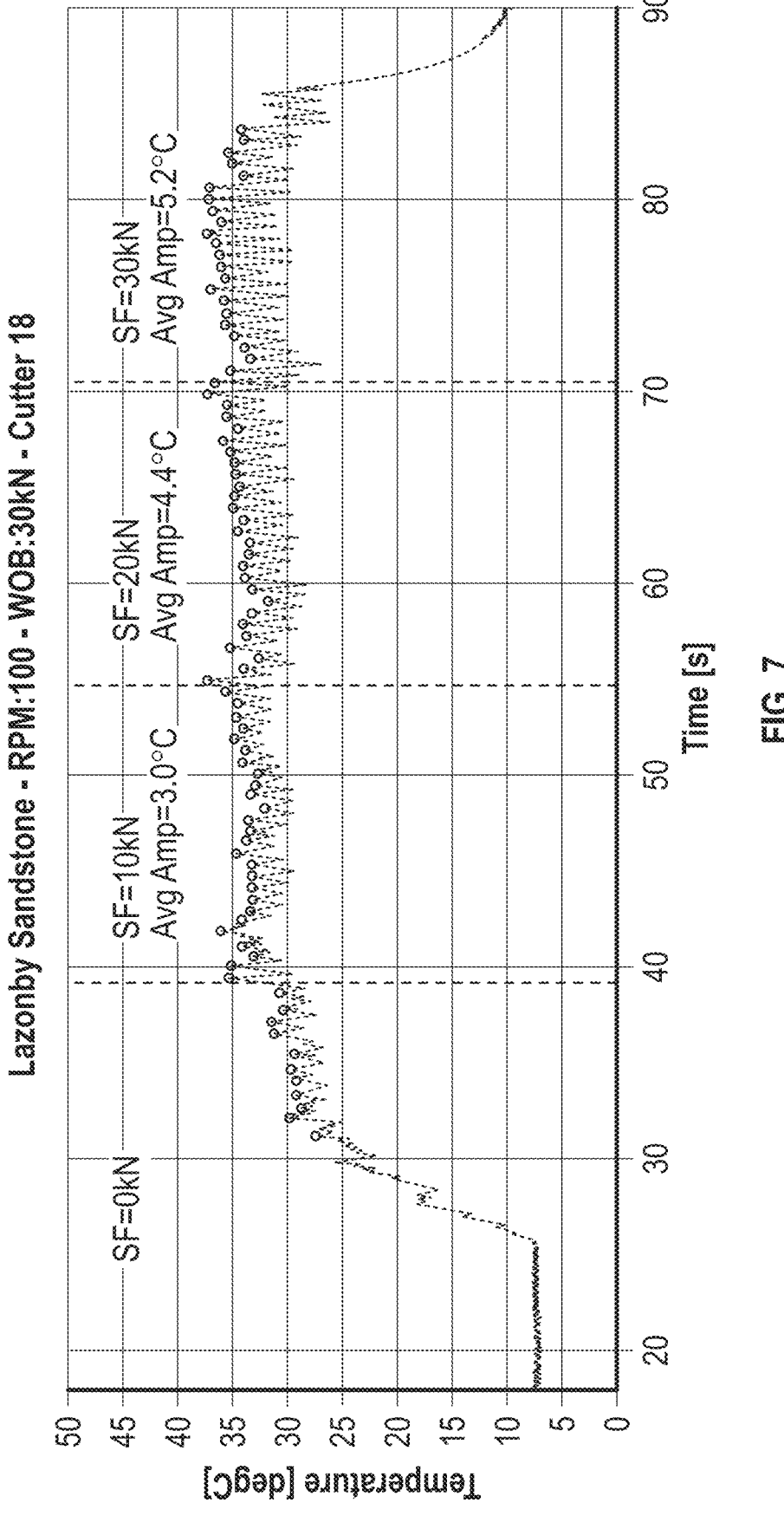
FIG. 7 is a plot of time-series temperature data representing temperature of the gauge cutting element C18 of the drill bit over time during the same drilling experiment of FIGS. 6A to 6E.
Figures 8A, 8B, 8C, 8D:
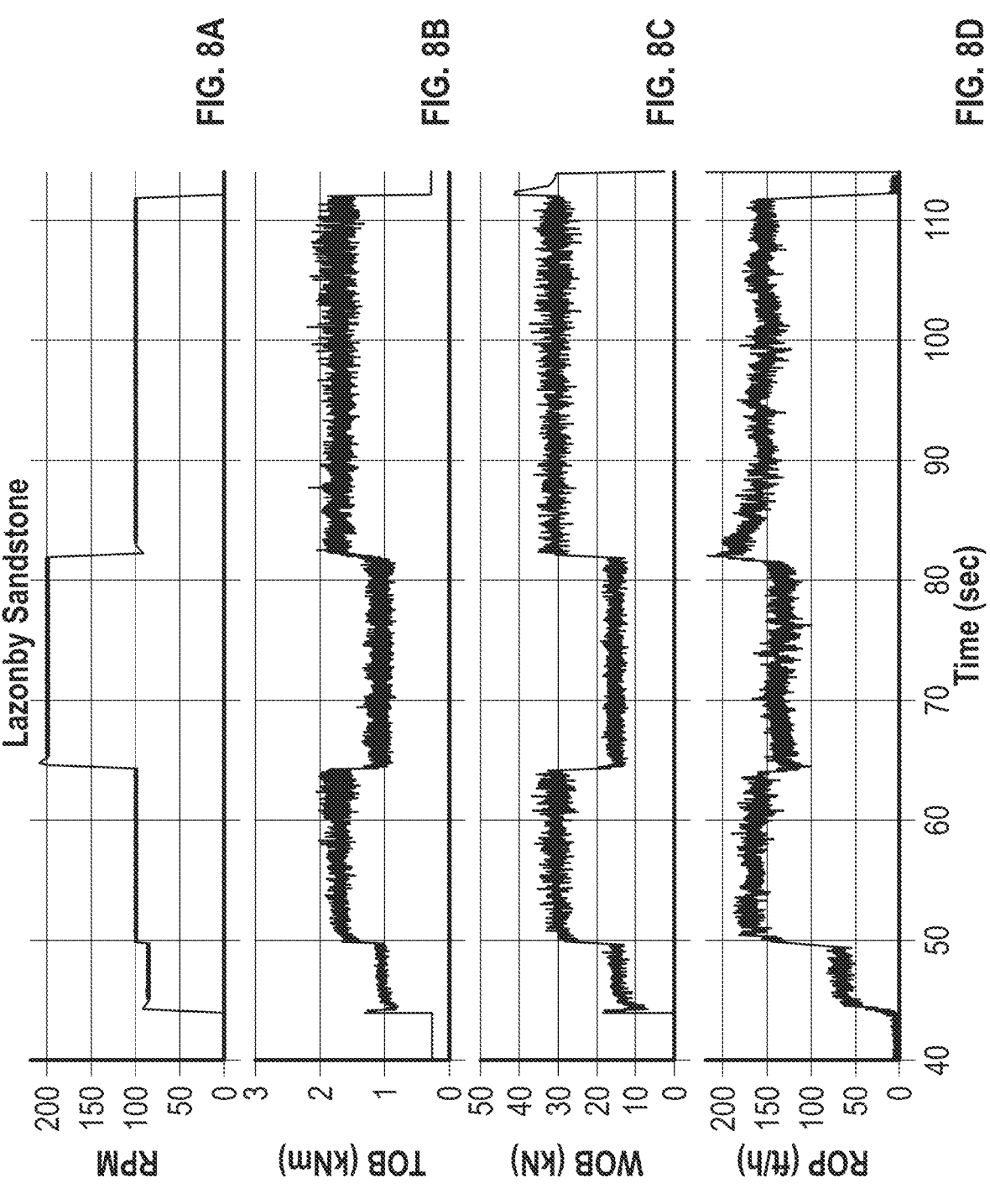
FIGS. 8A, 8B, 8C, and 8D depict plots of rotational speed (RPM), torque-on bit (TOB), weight-on-bit (WOB), and rate of penetration (ROP) of a drill bit of FIG. 5 over time during a drilling experiment performed on Lazonby sandstone where the drill bit is forced to drill in a backwards whirling mode, which is achieved by decreasing the WOB and increasing the RPM for the time period between 65 and 85 seconds in the plots.

FIG. 7 is a plot of time-series temperature data representing temperature of the gauge cutting element C18 of the drill bit over time during the same drilling experiment of FIGS. 6A to 6E.

The time-series temperature data of FIG. 7 can be analyzed to detect that a steering tool of the BHA of the drill bit is active and operating to control the direction of drilling. Under neutral drilling mode (i.e., with the bit rotating around its center), minimum engagement with the rock is expected for the gauge cutting elements C15 and C18 as predicted by a numerical model as shown in FIG. 5. However, the temperature of the gauge cutting element C18 starts oscillating when steering is active as shown in FIG. 7. This is because the gauge cutter C18 starts engaging with the rock due to the applied side force. Here, the frequency of the oscillations in the temperature data matches the bit RPM. Furthermore, the amplitude of the oscillations increases with the magnitude of side force since the engagement of the cutter elements increases accordingly.

FIGS. 8A, 8B, 8C, and 8D depict plots of rotational speed (RPM), torque-on bit (TOB), weight-on-bit (WOB), and rate of penetration (ROP) of a drill bit of FIG. 5 over time during a drilling experiment performed on Lazonby sandstone where the drill bit is forced to drill in a backwards whirling mode, which is achieved by decreasing the WOB and increasing the RPM for the time period between 65 and 85 seconds in the plots.

Figure 9:
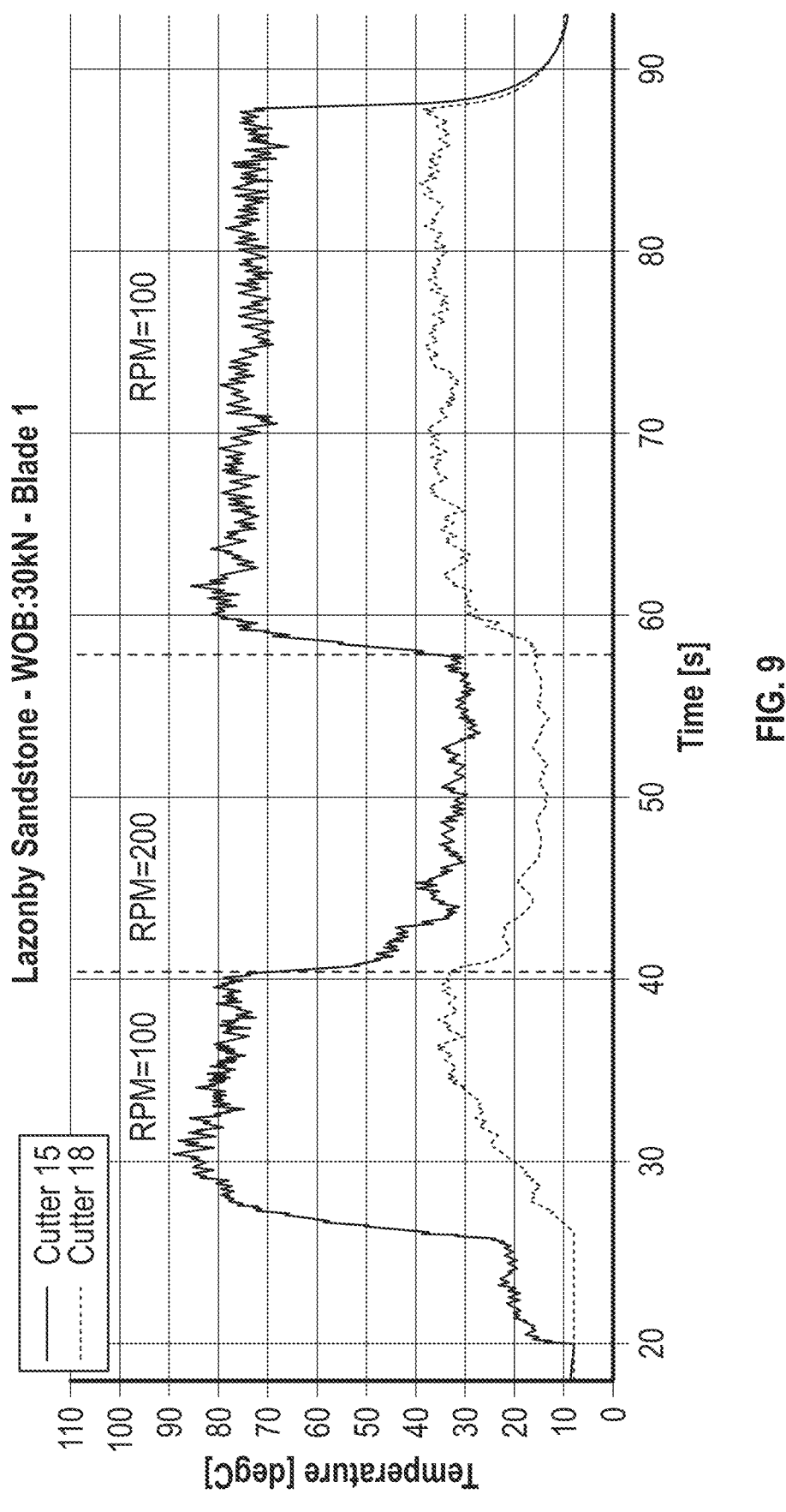
FIG. 9 is a plot of time-series temperature data representing temperature of the gauge cutting elements C15 and C18 of the drill bit during the same drilling experiment of FIGS. 8A to 8D.

FIG. 9 is a plot of time-series temperature data representing temperature of the gauge cutting elements C15 and C18 of the drill bit during the same drilling experiment of FIGS. 8A to 8D. The time-series temperature data of FIG. 9 can be analyzed to detect backwards whirling of the drill bit while drilling by detecting a sudden drop in the time series temperature data caused by the backwards whirling mode. Such drop in the time-series temperature data is most likely caused by the relative velocity of gauge cutters C15 and C18 with respect to the borehole wall becoming zero when the drill bit is rolling backwards on the gauge pads, i.e., no cutting action takes place.

Figure 10:
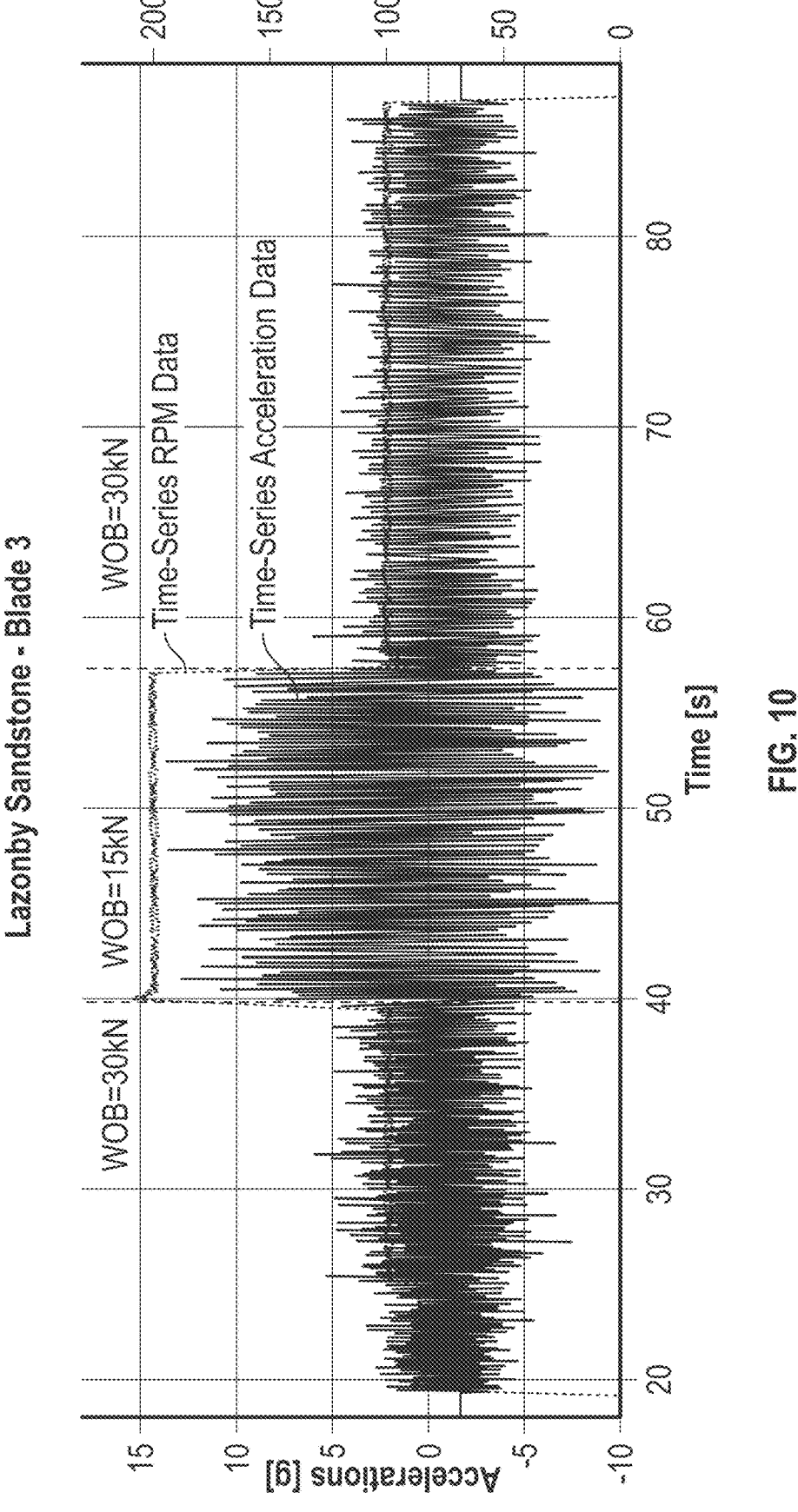
FIG. 10 depicts plots of time-series rotational speed (RPM) data and time-series acceleration (vibration) data of the drill bit of FIG. 5 during the drilling experiment of FIGS. 8A to 8D. The increase in magnitude of the time-series acceleration (vibration) data for the time period between 65 and 85 seconds in the plots provides further that the bit was drilling in backwards whirling mode for the time period between 65 and 85 seconds in the plots.

FIG. 10 depicts plots of time-series rotational speed (RPM) data and time-series acceleration (vibration) data of the drill bit of FIG. 5 during the drilling experiment of FIGS. 8A to 8D. The increase in magnitude of the time-series acceleration (vibration) data for the time period between 65 and 85 seconds in the plots provides further evidence that the drill bit was drilling in backwards whirling mode for the time period between 65 and 85 seconds in the plots.

Figure 11:
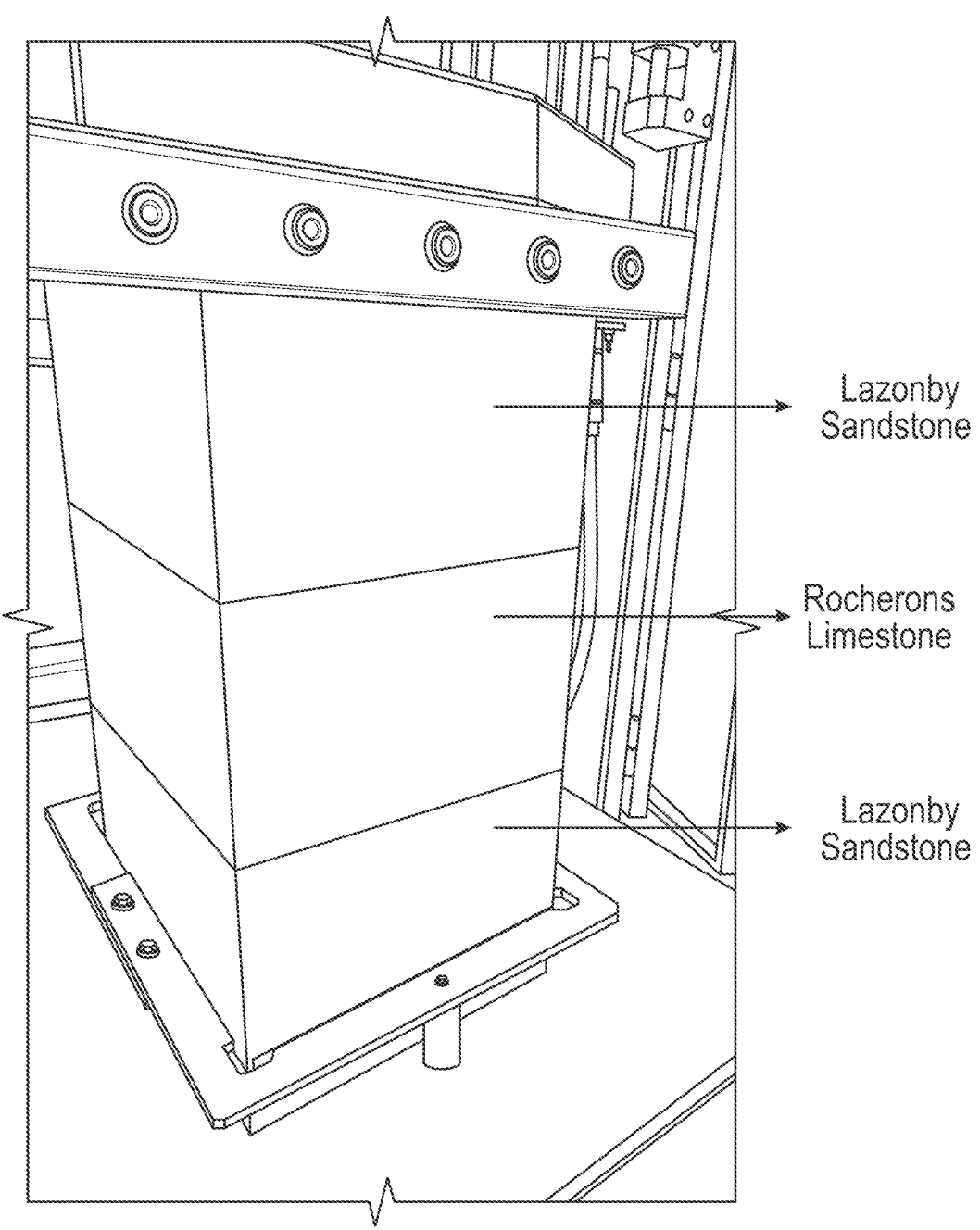
FIG. 11 is a photograph of a sandwich block that includes a middle layer of Rocheron limestone between top and bottom layers of Lazonby sandstone.

FIG. 11 is a photograph of a sandwich block that includes a middle layer of Rocheron limestone between the top and bottom layers of Lazonby sandstone.

Figure 12:
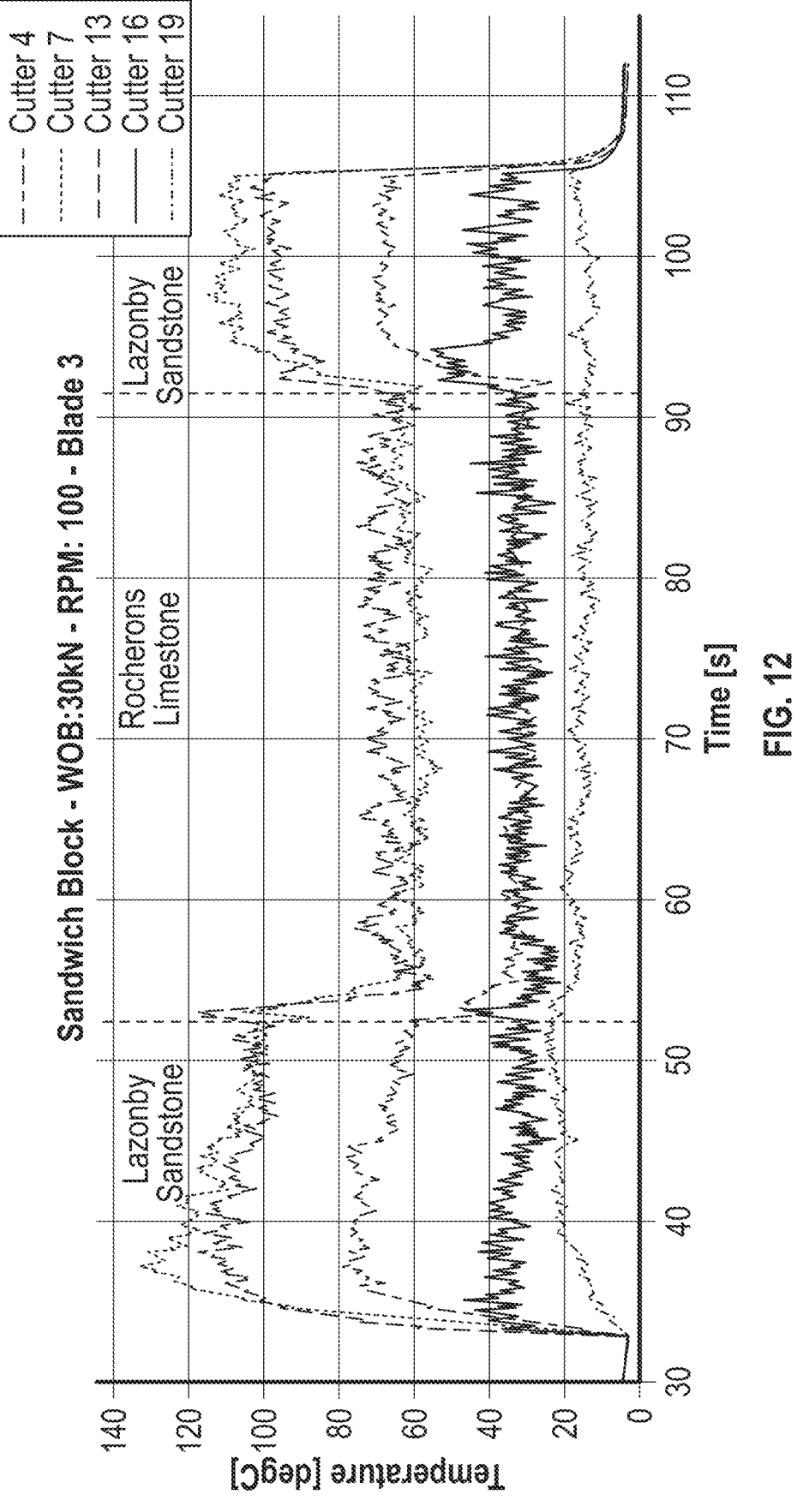
FIG. 12 depict plots of time-series temperature data representing temperature of different cutting elements of a drill bit over time during a drilling experiment that drills through the sandwich block of FIG. 11 at a constant weight-on-bit of 30 kN and a constant bit rotational speed of 100 RPM.

FIG. 12 depict plots of time-series temperature data representing temperature of different cutting elements of a drill bit over time during a drilling experiment that drills through the sandwich block of FIG. 11 at a constant weight-on-bit of 30 kN and a constant bit rotational speed of 100 RPM. The time-series temperature data of FIG. 12 can be analyzed to detect one or more transitions between different types of reservoir rock while drilling by detecting an increase or decrease in time-series temperature data that corresponds to a transition between different types of reservoir rock together with minimal variation in (relatively constant) the time-synchronized weight-on-bit (WOB) and rotational speed (RPM) of the drill bit.

Figure 13:
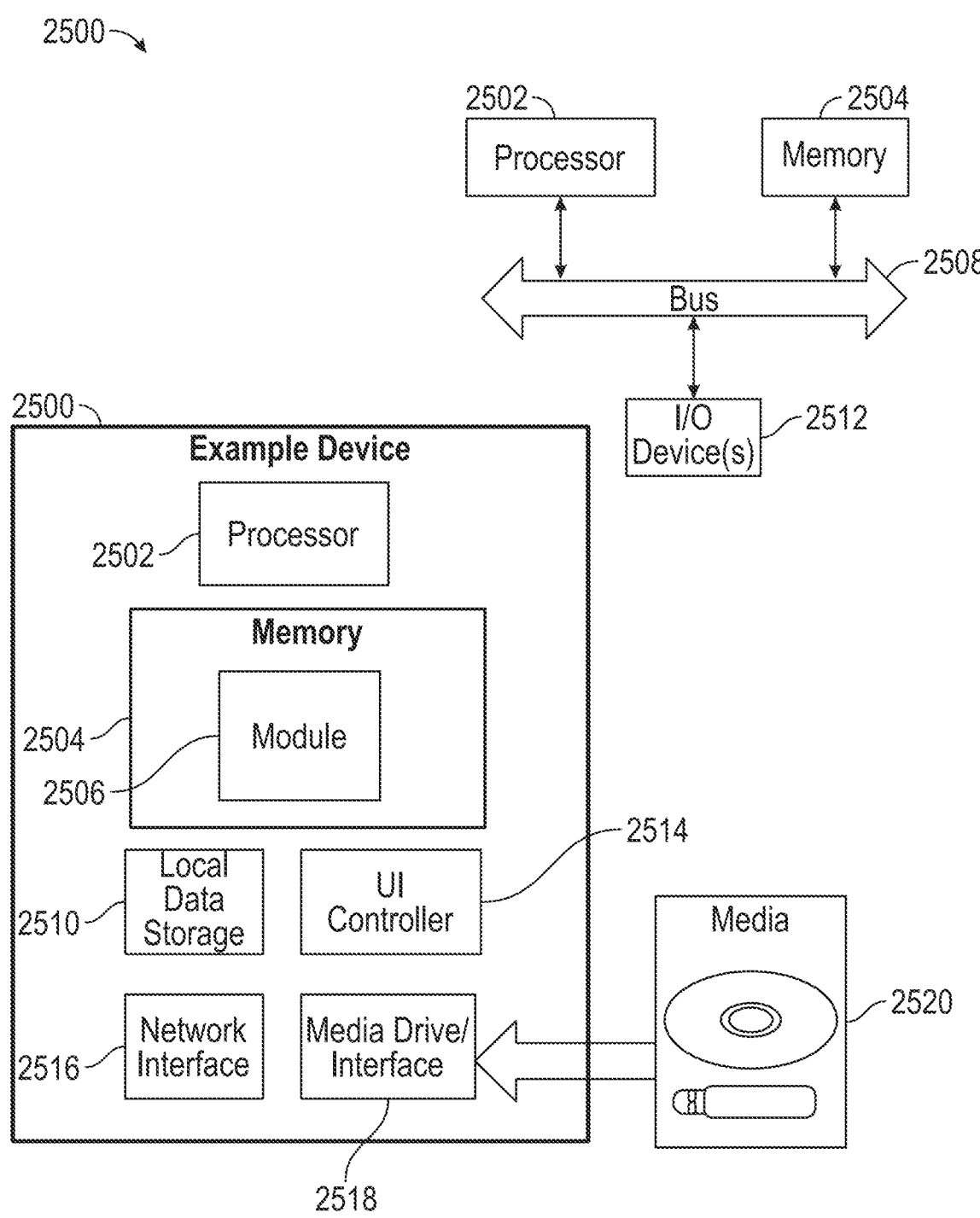
FIG. 13 is a schematic block diagram of a computer processing system.

FIG. 13 illustrates an example device 2500, with a processor 2502 and memory 2504 that can be configured to implement part(s) of methods and workflows as discussed in the present disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information into device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for detecting and monitoring at least one condition of a wellbore and/or drill bit while drilling, the method comprising:

drilling the wellbore with the drill bit, wherein the drill bit is instrumented with a temperature sensor configured to measure temperature associated with a cutting element of the drill bit over time while drilling;

using the temperature sensor to generate time-series temperature data representing temperature of the cutting element of the drill bit over time while drilling; and processing the time-series temperature data to determine at least one condition of the wellbore and/or the drill bit while drilling, wherein the at least one condition relates to detecting that a steering tool of a bottom hole assembly (BHA) of the drill bit is active and operating to control the direction of drilling, which involves detecting oscillations in the time-series temperature data for one or more cutting elements of the drill bit.

2. The method of claim 1, wherein:

the temperature sensor comprises a thermocouple, a resistance temperature detector (RTD), thermistor, semiconductor-based temperature sensor, infrared temperature sensor, thermometer, bimetallic sensor, change-of-state sensor, silicon diode, or other type of temperature sensor.

3. The method of claim 1, wherein:

the temperature sensor is configured to measure temperature representative of temperature at or near a cutting surface of the cutting element.

4. The method of claim 1, wherein:

the processing of the temperature data is performed by a downhole system or a surface-located system.

5. The method of claim 1, wherein:

the detecting that a steering tool of the BHA of the drill bit is active and operating to control the direction of drilling further involves determining frequency of such oscillations in the time-series temperature data and determining whether the frequency of such oscillations corresponds to time-synchronized rotational frequency or RPM of the drill bit.

6. The method of claim 5, wherein:

the frequency of such oscillations is extracted by applying a Fast Fourier Transform (FFT) to the time-series temperature data.

7. The method of claim 5, wherein:

the frequency of such oscillations is extracted by applying a peak finding signal processing technique to the time-series temperature data.

8. A method for detecting and monitoring at least one condition of a wellbore and/or drill bit while drilling, the method comprising:

drilling the wellbore with the drill bit, wherein the drill bit is instrumented with a temperature sensor configured to measure temperature associated with a cutting element of the drill bit over time while drilling;

using the temperature sensor to generate time-series temperature data representing temperature of the cutting element of the drill bit over time while drilling; and processing the time-series temperature data to determine at least one condition of the wellbore and/or the drill bit while drilling, wherein the at least one condition relates to detecting backwards whirling while drilling, which involves detecting a drop in the time-series temperature data for one or more cutting elements of the drill bit together with an increase in the time-synchronized rotational speed (RPM) of the drill bit.

9. A drilling system comprising:

a drill bit for drilling a wellbore through a formation, wherein the drill bit is instrumented with a temperature sensor configured to measure temperature associated with a cutting element of the drill bit over time while drilling; and a processor configured to:

generate or obtain time-series temperature data representing temperature of the cutting element of the drill bit over time while drilling as measured by the temperature sensor; and process the time-series temperature data to determine and monitor at least one condition of the wellbore and/or the drill bit while drilling, wherein the at least one condition relates to at least one of: i) detecting that a steering tool of a bottom hole assembly (BHA) of the drill bit is active and operating to control the direction of drilling, which involves detecting oscillations in the time-series temperature data for one or more cutting elements of the drill bit, and ii) detecting backwards whirling while drilling, which involves detecting a drop in the time-series temperature data for one or more cutting elements of the drill bit together with an increase in the time-synchronized rotational speed (RPM) of the drill bit.

10. The drilling system of claim 9, wherein:

the temperature sensor comprises a thermocouple, a resistance temperature detector (RTD), thermistor, semiconductor-based temperature sensor, infrared temperature sensor, thermometer, bimetallic sensor, change-of-state sensor, silicon diode, or other type of temperature sensor.

11. The drilling system of claim 9, wherein:

the temperature sensor is configured to measure temperature representative of temperature at or near a cutting surface of the cutting element.

12. The drilling system of claim 9, wherein:

the processor comprises a downhole processor or a surface-located processor.

13. The drilling system of claim 9, wherein:

the detecting that a steering tool of the BHA of the drill bit is active and operating to control the direction of drilling further involves determining frequency of such oscillations in the time-series temperature data and determining whether the frequency of such oscillations corresponds to time-synchronized rotational frequency or RPM of the drill bit.

14. The drilling system of claim 13, wherein:

the frequency of such oscillations is extracted by applying a Fast Fourier Transform (FFT) to the time-series temperature data.

15. The drilling system of claim 13, wherein:

the frequency of such oscillations is extracted by applying a peak finding signal processing technique to the time-series temperature data.

16. The method of claim 8, wherein:

the temperature sensor comprises a thermocouple, a resistance temperature detector (RTD), thermistor, semiconductor-based temperature sensor, infrared temperature sensor, thermometer, bimetallic sensor, change-of-state sensor, silicon diode, or other type of temperature sensor.

17. The method of claim 8, wherein:

the temperature sensor is configured to measure temperature representative of temperature at or near a cutting surface of the cutting element.

18. The method of claim 8, wherein:

the processing of the temperature data is performed by a downhole system or a surface-located system.

* * * * *